United States Patent [19]

Kamenster

[11] Patent Number: 4,864,707

[45] Date of Patent: Sep. 12, 1989

[54] METHOD OF ALIGNING A VORTEX METER

[75] Inventor: Boris A. Kamenster, Fountain Valley, Calif.

[73] Assignee: ITT Corporation, New York, N.Y.

[21] Appl. No.: 215,656

[22] Filed: Jul. 6, 1988

[51] Int. Cl.⁴ .................................................. B21D 53/00
[52] U.S. Cl. .................................. 29/157.1 R; 29/271; 29/464; 29/525.1
[58] Field of Search .................. 29/157.1 R, 271, 464, 29/525.1; 73/201; 269/235, 305; 285/31, 178, 325; 403/336, 337

[56] References Cited

U.S. PATENT DOCUMENTS

| | | | |
|---|---|---|---|
| 1,704,939 | 3/1929 | Grauel | 285/178 X |
| 2,994,342 | 8/1961 | Stillwagon | 285/325 X |
| 3,643,983 | 2/1972 | Ludeman | 285/31 |
| 3,857,969 | 4/1975 | Sgourakes et al. | 285/31 X |
| 4,345,464 | 8/1982 | Herzl et al. | 73/201 |
| 4,426,103 | 1/1984 | Sundholm | 285/178 X |

Primary Examiner—P. W. Echols
Assistant Examiner—Andrew E. Rowlins
Attorney, Agent, or Firm—Menotti J. Lombardi

[57] ABSTRACT

A method and tool for alignment of a vortex meter with pipe flanges having raised faces on the side engaged by the meter, the tool comprising a round cylinder having an eccentric hole longitudinally therethrough for rotating the tool to touch raised spaces on the flanges whereby the flanges may be aligned, and the method comprising placing two such tools which are slightly longer than the dimension of the meter body, each having an eccentric hole longitudinally therethrough, passing a bolt through the holes in the flanges and longitudinally through the tool, rotating the tools until they touch the raised faces, and placing the meter body and any required gaskets between the flanges until it rests on the tools, after which the bolts are tightened through the other holes in the flanges as well as tightening the bolts through the tools.

4 Claims, 3 Drawing Sheets

METHOD OF ALIGNING A VORTEX METER

BACKGROUND OF THE INVENTION

1. Field of the Invention

This invention relates to tools for aligning vortex flow meters between flanges on fluid pipes.

2. Description of the Prior Art

In the prior art, an alignment tool provided by Foxboro has two right angled sections slidably mounted on each other with holes through the ends thereof. The ends are rectangular in shape with the two downward corners cut off at 45 angles of different lengths. Two tools are supplied with the flow meter to properly align the flow meter bore with the inside diameter of the adjacent piping. They establish a predetermined spacing between the mounting studs or bolts and the outside diameter of the flow meter body. It is necessary that the studs or bolts be of the proper diameter to establish alignment. The bore of the flow meter and inside diameter of the adjacent piping must be aligned within 1.5 millimeters. With the 45° cutouts, each alignment tool has five sides. When positioning the tools to tighten the flange studs or bolts, the correct side must be held against the outside diameter of the flow meter body for the flow meter size involved. A disadvantage of this type of tool is that it must be removed from the meter after alignment, and in service in the field the tool may become lost so that future alignment is not facilitated. The tool is also relatively complex compared with the simple tool of the subject disclosure.

In accordance with an aspect of the present invention, it is an object to provide a new and improved alignment tool and method of aligning a vortex meter.

Another object is to provide such a tool which may remain with the meter in service to be available for subsequent alignment.

SUMMARY OF THE INVENTION

The foregoing and other objects are accomplished by providing a tool for aligning a meter body between two flanges having raised faces thereon in the form of a round cylinder having an eccentric hole longitudinally therethrough so that the tool may be rotated to touch the raised faces whereby the flanges may be aligned. A method involves using two such tools mounted on bolts through two of a plurality of bolt holes in the flanges and rotating the tools until they touch the raised faces. The meter body may then be placed with any required gaskets between the flanges until it rests on the tools. The remaining bolts are then tightened in the flanges as well as bolts through the tools. The tools may remain in place during service in the field.

Other objects, features and advantages of the invention will become apparent from a reading of the specification when taken in conjunction with the drawings, in which like reference numerals refer to like elements in the various views.

DESCRIPTION OF THE PREFERRED EMBODIMENT

Figure 1:
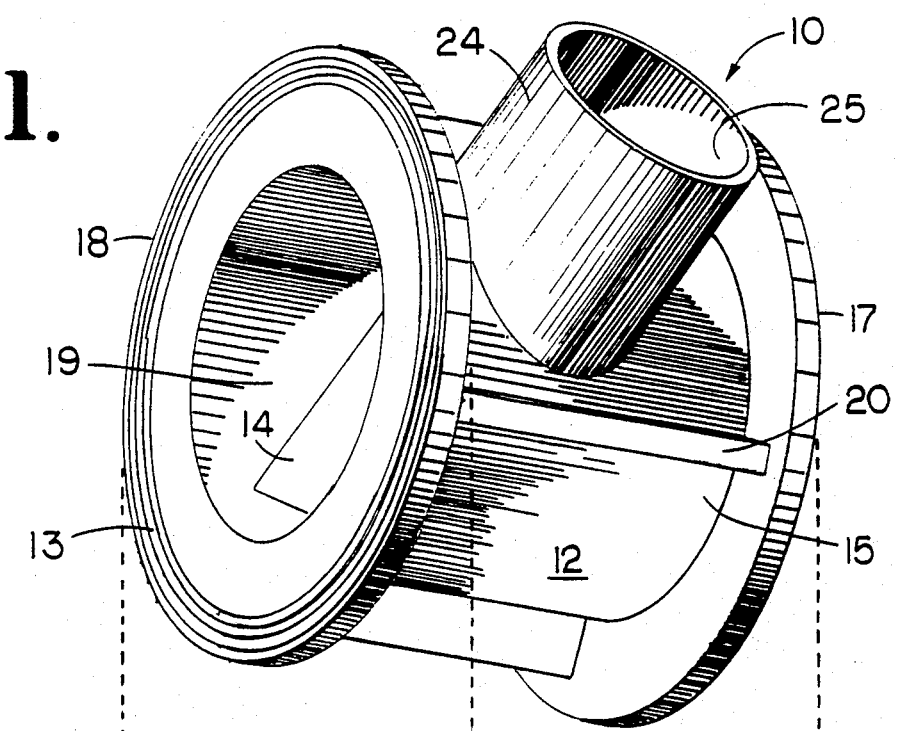
FIG. 1 is a perspective view of a one-piece vortex meter body of the prior art such as is aligned with the alignment tool of the subject invention.

In the preferred embodiment a vortex meter of the prior art having a unitary vortex meter body such as is illustrated in FIG. 1 and generally indicated as 10, includes an outer housing portion 12 and an inner bluff body portion 14. The meter body 10 is formed of metal such as 316 stainless steel which is formed such as by investment casting in one piece. The housing portion 12 is provided with a central tubular conduit portion 15 in the form of a relatively thin-walled tubular sleeve with first and second enlarged diameter generally identical dimensioned flange portions 17 and 18 formed integrally therewith for connection to a fluid flow pipeline. The outer connecting surfaces of the flange portions 17 and 18 are generally planar and parallel to one another, with a portion of the surface having a plurality of concentric circumferential serrations or grooves 13 which engage suitable packing material between the flanges and other pipe fittings in the flowline. The conduit portion 12 has a generally centrally disposed fluid flow opening 19 of generally circular cross-section with the fluid flow being directed in the direction of the axis of the conduit 12. A reinforcing rib 20 extends between flanges 17 and 18 radially outwardly from the outer surface of the conduit portion 12. A relatively large diameter columnar protrusion 24 extends radially beyond the periphery of the flange portions 17 and 18. The inside diameter of protrusion 24 forms an upper chamber 25 which provides an entry way for the sensor and electronics. Such a vortex meter body is disclosed in U.S. Pat. No. 4,718,283, Kamenster, assigned to the assignee of the present invention.

Figure 2:
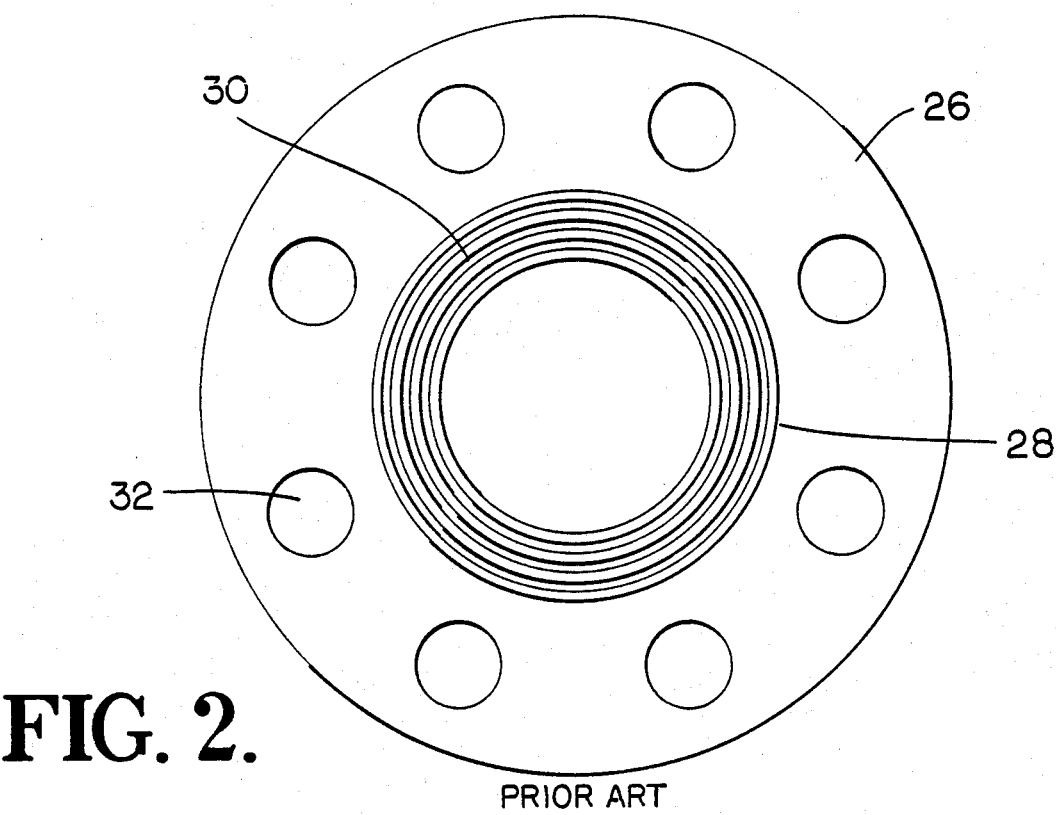
FIG. 2 is the vortex meter side of a pipe flange between two of which the vortex meter is mounted.

FIG. 2 illustrates a pipe flange 26 having a raised face 28, which may be between 1/16"-⅛ high, having a plurality of concentric circumferential serrations or grooves 30 for engagement of suitable packing material between the pipe flange 26 and the meter flange 17 or 18. The outside diameter of the vortex meter flange 17 or 18 is equal to the raised face diameter of the pipe flange 26. Pipe flange 26 also contains a plurality of bolt holes 32 for passing bolts therethrough parallel to the axis of the meter body 12, and for clamping the meter body 12 between two pipe flanges 26.

Figure 3:
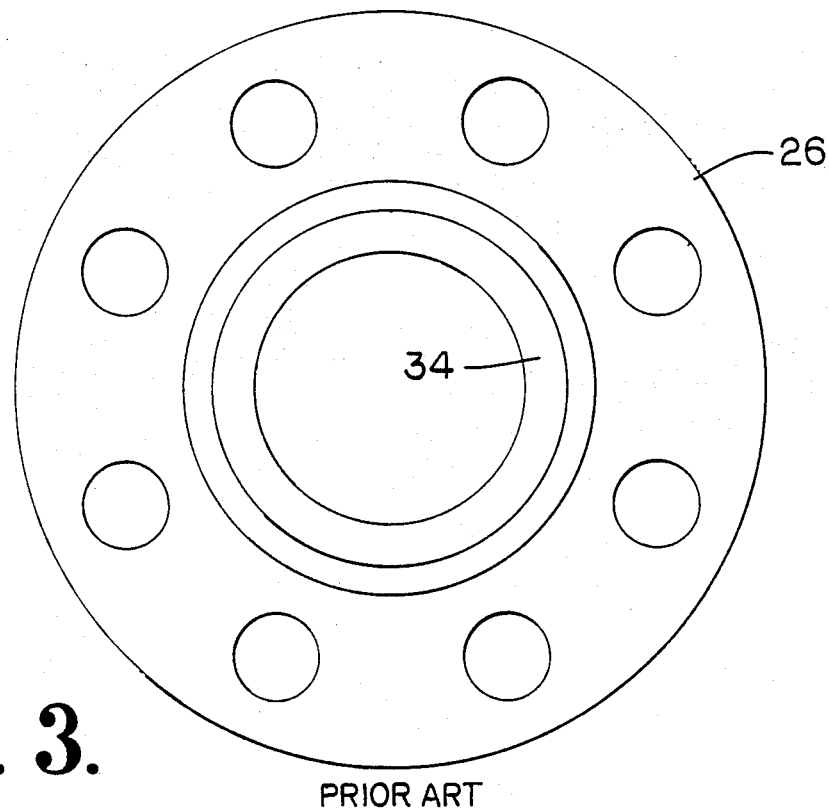
FIG. 3 is the pipe side of the flange of FIG. 2.

FIG. 3 shows the reverse side of pipe flange 26 containing a raised portion 34 to which a fluid pipe may be attached.

Figure 4:
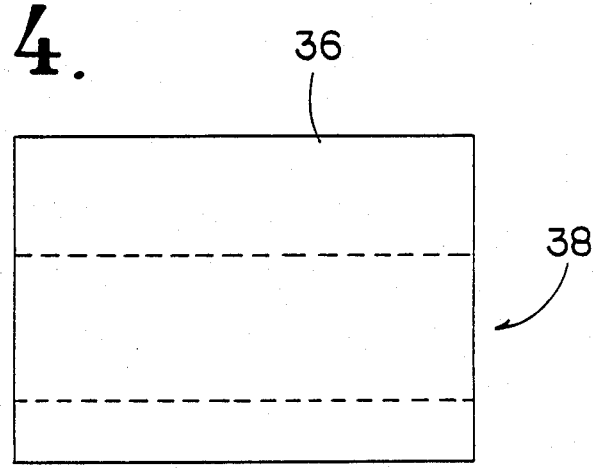
FIG. 4 is a side view of the tool of the subject invention.
Figure 5:
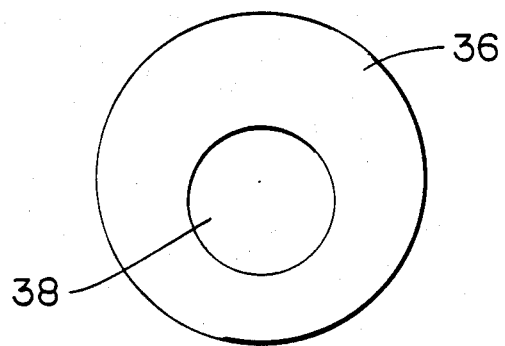
FIG. 5 is an end view of the tool of FIG. 4.

The tool of the subject invention is illustrated in side and end views in FIGS. 4 and 5, and is made of a cylinder 36 having an eccentric longitudinal hole 38 therethrough. The hole 38 through cylinder 36 may be made large enough to accommodate the largest size bolt in the corresponding flanges 26 for the corresponding meter body size.

Figure 6:
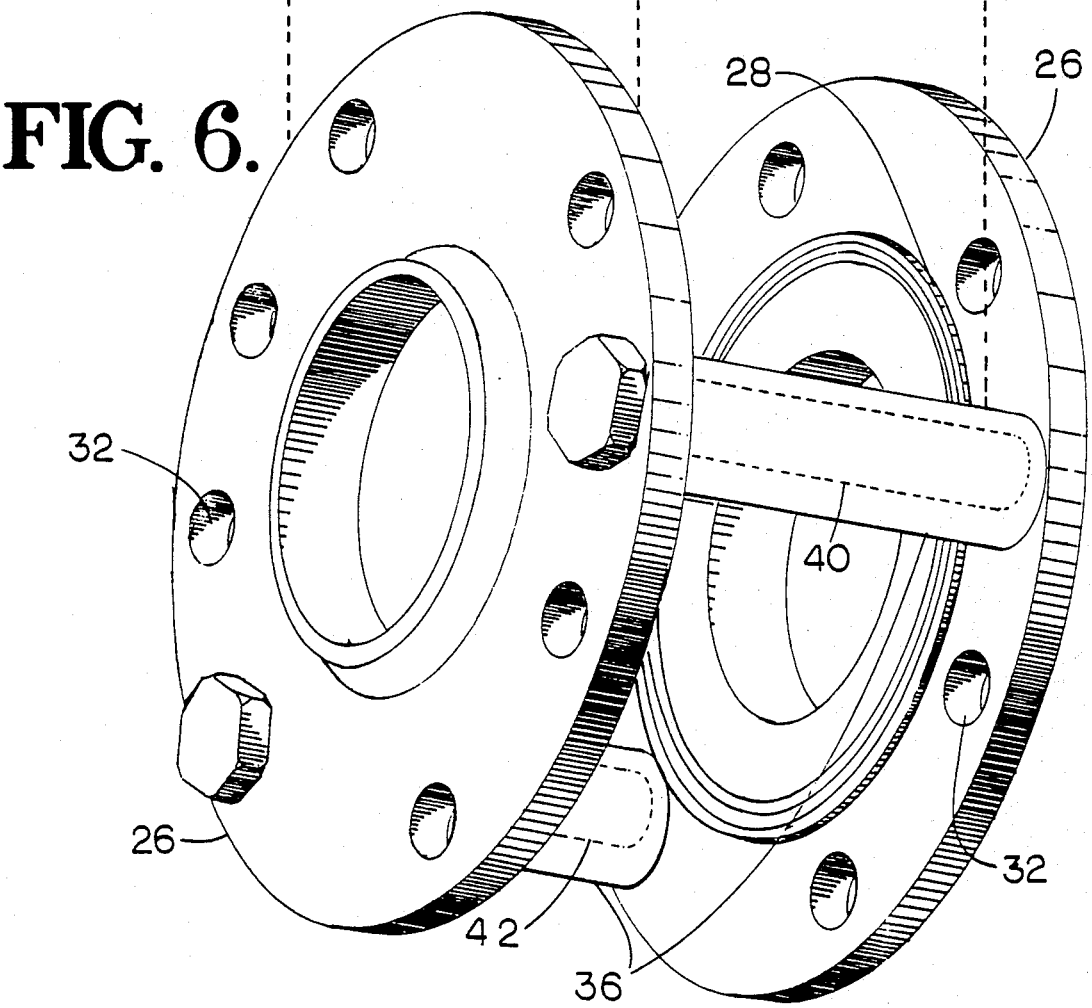
FIG. 6 is a perspective view of the tools mounted on bolts between two pipe flanges prior to the insertion of the meter body.

FIG. 6 illustrates the alignment method of the subject invention. Two flanges 26 having bolt holes 32 have two bolts 40 and 42 passed through two of the bolt holes 32 with a tool 36 mounted on each of bolts 40 and 42. The tools 36 having eccentric holes therethrough are of a dimension such that they can then be rotated so that their inner surface touches the outside of the raised face 28 on each of the flanges 26. The meter body 10 may then be dropped down between the two tools 36 as shown by the dashed lines between FIG. 1 and FIG. 6, and will align its flanges 17 and 18 with the equal diameter raised faces 28 of the flanges 26 with any necessary packing or gasket material therebetween. The remaining bolts in holes 32 not containing the tools 36 may then be bolted together prior to bolting the two containing the tools 36 to secure the meter body 12 between the flanges 26 or subsequently. The tools thus remain in place during service in the field so that they will not get lost and will be available for alignment of the meter body should the meter body have to be re-aligned. The flange hole 32 may be an eighth of an inch larger than its corresponding bolt, for example; the hole is drilled for the largest size bolt required.

In one embodiment, the proposed alignment tool 36 may be a cylinder with a bolt hole drilled eccentric to the outer cylindrical surface with a length equal to the thickness of the vortex meter plus 0.05 inches. The cylinders 36 act as cams when rotated around the axis of the bolt due to the eccentric hole therethrough, and should be rotated until the outer cylindrical surface of the tool 36 touches the outer rim of the raised face surface 28. After tightening the other bolts the alignment tools may be removed, if desired. However, as stated above it is often found convenient to keep them in place. In the event the holes 38 through the tools 36 are larger than the bolt holes 32 since they have been made large enough to accommodate the largest size bolt in the flanges 26 for a corresponding meter size, it is possible that the tool 36 could cant because it is loose on its bolt and does not strike one raised face. To overcome this the tool 36 can be made as long as 1-2 times the height of a raised face 28 plus the length of the meter body 10 plus any gasket or packing width to assure that it will not cant inside one of the raised faces 28.

The advantages of the tool and method of the subject invention is that the tool is low-cost and very simple to use. It does not require adjustments such as the prior art, and one man can install a vortex meter.

While a particular embodiment of the invention has been described, it will be understood of course that it is not intended to limit the invention thereto, since many modifications may be made. It is therefore contemplated by the appended claims to cover any such modifications as fall within the true spirit and scope of the invention.

What is claimed as new and desired to be secured by Letters Patent of the United States is:

1. A method of aligning a flow meter between two flanges having a plurality of aligned bolt holes therethrough, and raised faces on the side the meter engages, comprising the steps of; placing two cylindrical tools, slightly longer than the dimension of the meter body, each having an eccentric hole longitudinally therethrough by passing a bolt through holes in the flanges and longitudinally through said tool; rotating said tools on said bolts until they touch the raised faces; placing a meter body and any required gaskets between said flanges until it rests on said tools; and tightening bolts through the holes in the flanges.

2. The method of claim 1 wherein slightly longer is defined by 1-2 times the length of a raised face plus any packing.

3. The method of claim 1 in which the bolts through the flanges not containing the tools are first tightened, and the bolts through the tools are subsequently tightened.

4. The method of claim 1 in which the bolts through the holes other than the tools are first tightened, and the bolts through the tools then reinserting the bolts through the holes in the flanges, are then removed, removing the tools, and subsequently tightening the bolts.

* * * * *